US010579822B1

(12) United States Patent
Gulsen et al.

(10) Patent No.: US 10,579,822 B1
(45) Date of Patent: Mar. 3, 2020

(54) SECURE COMMINGLING OF TENANT ISOLATED DATA

(71) Applicant: Workday, Inc., Pleasanton, CA (US)

(72) Inventors: Denis Gulsen, Redwood City, CA (US); Erol Guney, San Ramon, CA (US); Eric James Ranstrom, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 117 days.

(21) Appl. No.: 15/693,924

(22) Filed: Sep. 1, 2017

(51) Int. Cl.
G06F 21/62 (2013.01)

(52) U.S. Cl.
CPC .................. G06F 21/6245 (2013.01)

(58) Field of Classification Search
CPC . G06F 21/6245; G06F 21/6254; H04L 63/105
See application file for complete search history.

(56) References Cited

U.S. PATENT DOCUMENTS

| 7,890,592 | B2* | 2/2011 | Setiawan | G06Q 10/00 709/206 |
| 10,250,624 | B2* | 4/2019 | Mixer | H04L 63/1425 |
| 10,373,194 | B2* | 8/2019 | Opie | G06Q 30/0246 |
| 2008/0077515 | A1 | 3/2008 | Zoldi | |
| 2010/0161362 | A1 | 6/2010 | Shapira | |
| 2014/0075004 | A1 | 3/2014 | Van Dusen | |
| 2014/0129662 | A1 | 5/2014 | Sandy | |
| 2014/0157370 | A1 | 6/2014 | Plattner et al. | |
| 2016/0070758 | A1 | 3/2016 | Thomson | |
| 2016/0112208 | A1 | 4/2016 | Williams | |
| 2017/0169800 | A1 | 6/2017 | Greco | |
| 2018/0121622 | A1 | 5/2018 | Armstrong | |
| 2018/0157761 | A1 | 6/2018 | Halstead | |
| 2018/0285596 | A1* | 10/2018 | Jones | G06F 21/6245 |

* cited by examiner

Primary Examiner — Maung T Lwin
Assistant Examiner — Suman Debnath
(74) Attorney, Agent, or Firm — Van Pelt, Yi & James LLP

(57) ABSTRACT

A system for secure commingling of tenant isolated data includes a commingling storage unit, an interface, and a processor. The interface is configured to receive an indication of tenant data to be commingled. The processor is configured to determine one or more instances of sensitive data included in the tenant data, and indicate to transfer the tenant data to be stored in the commingling storage unit without transferring the one or more instances of sensitive data.

17 Claims, 11 Drawing Sheets

300

| Tenant Data | | | | |
|---|---|---|---|---|
| ID # | Name | Gender | Title | Salary |
| 961201338 | Jason King | M | Engineer I | 85000 |
| 020221304 | Anna Hettich | F | Manager | 90000 |
| 193045732 | Meredith Murphy | F | Engineer I | 85000 |
| 108960805 | Matt Steiger | M | Sr. Manager | 105000 |
| 937613833 | Christine Goldbard | F | Sales | 85000 |
| 806712881 | Carl Nikolov | M | Sales | 85000 |
| 167344647 | Josh Angela | M | Engineer II | 95000 |
| 638493704 | Stan Miltenberger | M | Manager | 90000 |
| 428342316 | Michelle Charrow | F | Engineer II | 95000 |
| 518982603 | Laura Muffington | F | Sr. Manager | 105000 |

SECURE COMMINGLING OF TENANT ISOLATED DATA

BACKGROUND OF THE INVENTION

On a software as a service platform, tenant data is strictly segregated in order to maintain separation between any given tenant's data and the data of another tenant. Tenant data is stored on a set of data partitions securely separated by tenant (e.g., on different computers, on different hard drives, on different virtual machines, etc.) in order to prevent users from accessing data belonging to other tenants. In some situations, it may be desirable to share certain tenant data for comparison purposes or to get a more complete view of a situation (e.g., salary surveys or other industry benchmarks) and a set of tenant data is provided to a third party in exchange for access to the pooled set. However, this sharing is usually requires preparation for the tenant to scrub the data to be shared of any proprietary or sensitive data and, because of this, the sharing only takes place sporadically making the shared data usually not quite up to date.

BRIEF DESCRIPTION OF THE DRAWINGS

Various embodiments of the invention are disclosed in the following detailed description and the accompanying drawings.

FIG. 3 is a diagram illustrating an embodiment of tenant data.

DETAILED DESCRIPTION

Figure 1:
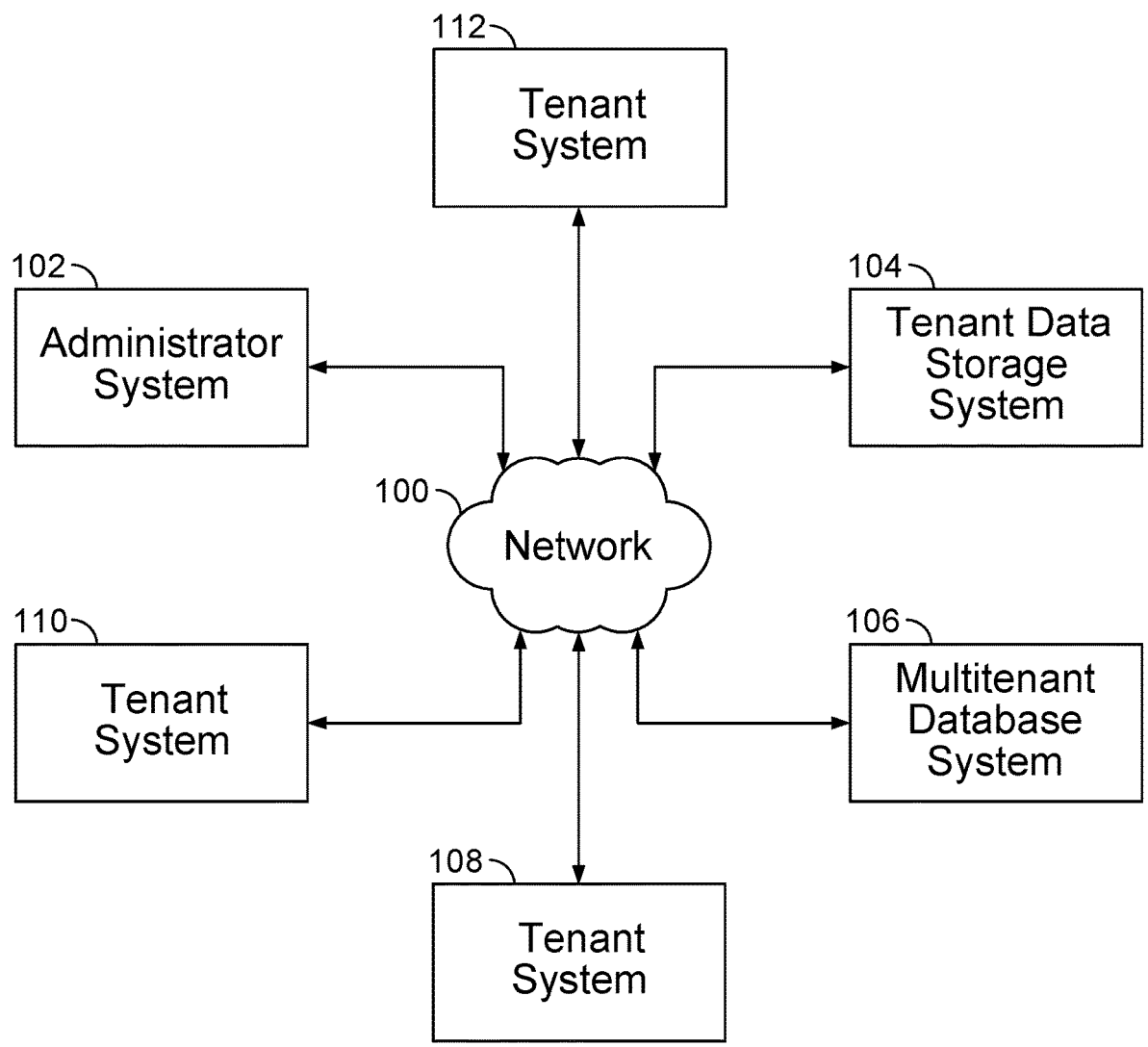
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for secure commingling of tenant isolated data is disclosed. The system includes a commingling storage unit, an interface, and a processor. The interface is configured to receive an indication of tenant data to be commingled. The processor is configured to determine one or more instances of sensitive data included in the tenant data, and transfer the tenant data to be stored in the commingling storage unit without transferring the one or more instances of sensitive data. In some embodiments, the system for secure commingling of tenant isolated data additionally comprises a memory coupled to the processor and configured to provide the processor with instructions.

A system for secure commingling of tenant isolated data comprises a set of tenant data storage units and a commingling storage unit. Tenant data for a tenant is stored for typical system use on a tenant data storage unit. A tenant has access to its tenant data stored on its associated tenant data storage unit but not to tenant data stored on tenant data storage units associated with other tenants. In some cases, it is useful for a tenant to have access to other tenants' data—for example, for the calculation of benchmark reports. For example, a tenant may desire to share its data in order to be able to determine how its own data compares to a broader set of data (e.g., salaries of the tenant's employees as compared to salaries of a broader set of employees). A tenant is prompted to opt in to the secure data commingling system. In the event the tenant opts in, tenant data is filtered. A filter identifies sensitive data included in the tenant data and removes the sensitive data (e.g., deletes the sensitive data, replaces the sensitive data with random data, replaces the sensitive data with a data hash, etc.). The filtered data is then transferred from the tenant data storage unit to a commingling storage unit. Tenants that have opted in to the secure data commingling system are able to request reports run on data stored within the commingling storage unit (e.g., average engineer salary over all companies). As a safeguard to identification of data associated with any specific tenant, before report data is presented in response to a request, it is analyzed to determine whether it can be linked to a specific tenant—for instance, if report data comprises only data from a single tenant or data from a single tenant combined with data from the requesting tenant. In the event the report data is determined to be able to be linked to a specific tenant, reporting is blocked (e.g., the report is not provided to the requesting tenant).

FIG. 1 is a block diagram illustrating an embodiment of a network system. In some embodiments, the network system of FIG. 1 comprises a system for secure commingling of tenant isolated data. In the example shown, tenant system 108, tenant system 110, and tenant system 112 store data associated with each of the different systems in separate areas of tenant data storage system 104 This separation ensures that a given tenant's data is secure. However, there are times when it is useful to have access to have access to a pool of many tenants' data in exchange for providing access to the tenant's own data. Data that is part of the multitenant pool of data is stored either in tenant data storage system 104 in a commingling area or in multitenant database system 106. Multitenant database system 106 enables access to the multitenant pool of data as part of a service (e.g., a benchmarking service that enables comparison of tenant data with a larger pool of data from other tenants). A tenant can opt in to sharing data in exchange for access to the data pool and opting in enables multitenant database system 106 to access a copy of relevant data associated with the opt in plan and appropriately stripped of identification information. Administrator system 102 is able to administrate different components of the system including multitenant database system 106.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer organization, employee, financial data, etc.). Tenant data storage system 104 comprises a plurality of tenant data storage units for storing tenant data isolated by tenant, and in some cases, a commingling storage unit for storing commingled tenant data. Multitenant database system 106 comprises a database system for providing tenant user access to data stored on either in a commingling storage unit of tenant data storage system 104 or in multitenant database system 106 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Tenant data storage system 104 comprises a tenant data storage system for storing data in a database for a set of tenants. Tenant data storage system 104 comprises a set of distinct tenanted storage systems (for example—separate hard drives, separate virtual machines, etc.) for storing tenant data in such a way that tenants cannot access each other's data. Tenant data storage system 104 additionally comprises a secure data commingling system for managing data transfer from the tenanted storage systems to the commingling storage and for executing data analyses and reporting on the commingling storage unit. Multitenant database system 106 comprises a system for performing database actions (e.g., storing data, modifying data, querying data, performing reports, etc.) on tenant data stored in a commingling storage area of either tenant data storage system 104 or multitenant database system 106. A secure data commingling system includes interfaces for transmitting and receiving tenant data (e.g., from one or more tenant data storage units to a commingling storage area). The secure data commingling system additionally comprises a processor for determining one or more instances of sensitive data included in the tenant data, and for indicating (e.g., to the interface) to transfer the tenant data to be stored in a commingling storage unit without transferring the one or more instances of sensitive data.

In the following FIGS. 2A, 2B, 2C, and 2D, variations of the location of the subsystems of the secure data commingler and the commingling storage unit are shown. Specifically, the location of the secure data commingler and the commingling storage unit is either in the tenant data storage unit (a combination of FIG. 2A and FIG. 2D are used as the implementations for the corresponding units in FIG. 1), the multitenant database system (a combination of FIG. 2B and FIG. 2C are used as the implementations for the corresponding units in FIG. 1), or both the tenant data storage unit and the multitenant database system (a combination of FIG. 2A and FIG. 2C are used as the implementations for the corresponding units in FIG. 1).

Figure 2A:
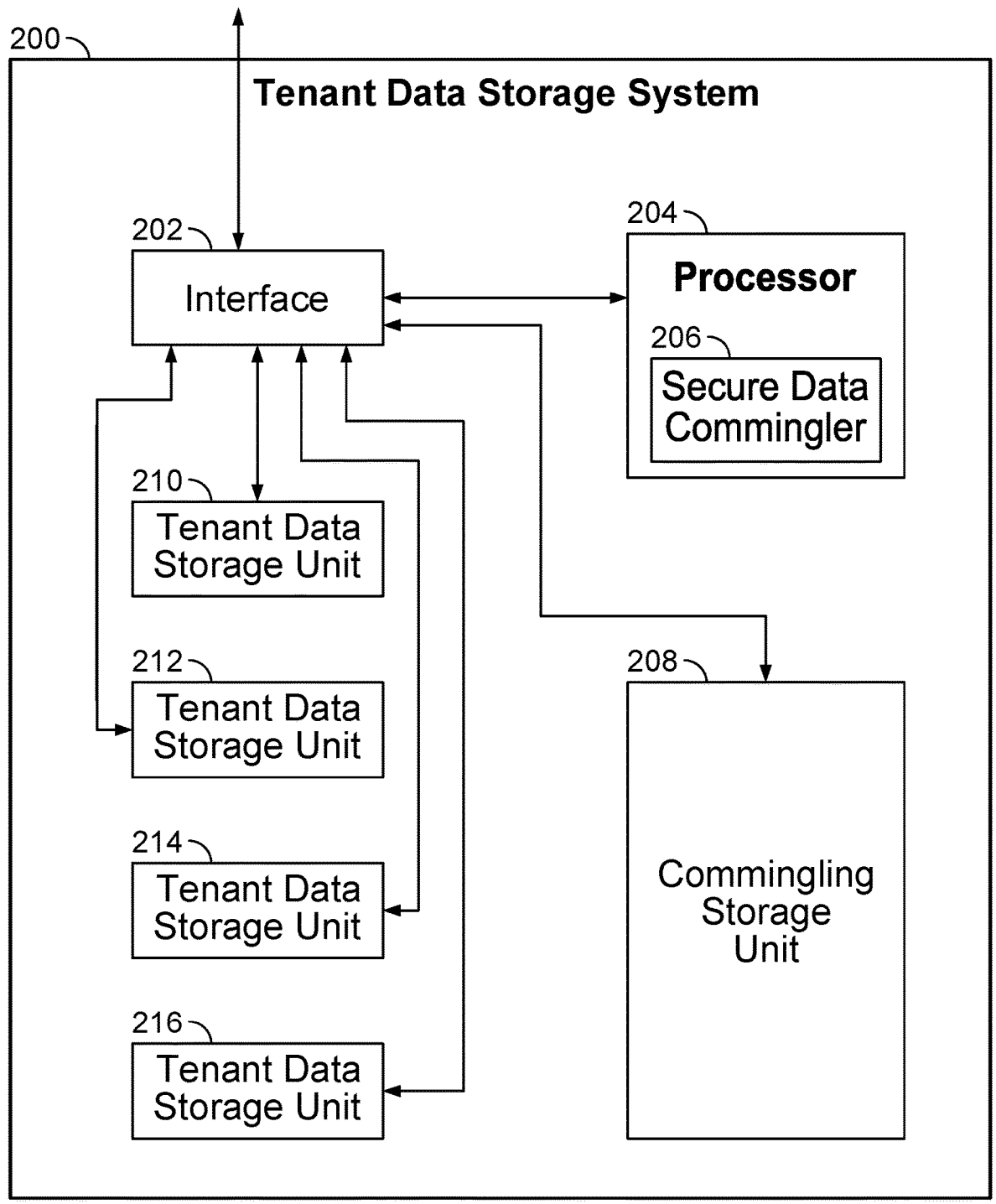
FIG. 2A is a block diagram illustrating an embodiment of a tenant data storage system.

FIG. 2A is a block diagram illustrating an embodiment of a tenant data storage system. In some embodiments, tenant data storage system 200 comprises tenant data storage system 104 of FIG. 1. In the example shown, tenant data storage system 200 is used to store different tenants' data in separate storage areas in tenant data storage unit 210, tenant data storage unit 212, tenant data storage unit 214, and tenant data storage unit 216. Each tenant has associated with it a separate storage area—for example, each tenant data storage unit could be entirely associated with a different single tenant. The plurality of tenant data storage units serves to store data associated with different tenants. Tenant data storage system 200 comprises any appropriate number of tenant data storage units. Tenant data storage system 200 additionally comprises commingling storage unit 208 for commingling a portion of tenant data. Tenant data storage system 200 additionally comprises secure data commingler 206. Tenant data storage system 200 comprises processor 204 and interface 202. Interface 202 comprises an interface for receiving requests to provide or store tenant data (e.g., to and from tenant data storage unit 210, from tenant data storage unit 212, from tenant data storage unit 214, or from tenant data storage unit 216) and for providing and receiving tenant data to be commingled in commingling storage unit 208. Secure data commingler 206 of processor 204 determines one or more instances of sensitive data included in the tenant data and indicates to prevent the one or more instances of sensitive data included in the tenant data from being transferred from a tenant data storage unit to commingling storage unit 208. Processor 204 indicates to interface 202 to transfer tenant data to be stored in commingling storage unit 208 without transferring the one or more instances of sensitive data. Interface 202 additionally comprises an interface for receiving an indication to transfer data to commingling storage unit 208, receiving a request for report data based on data stored in commingling storage unit 208, receiving an indication of a new tenant, etc. Data stored on commingling storage unit 212 is used for a service (e.g., determination of statistics, reporting, benchmarking, etc.).

In various embodiments, tenant data is transferred upon request (e.g., a tenant request, an administrator request, etc.) or tenant data is transferred automatically (e.g., according to a predetermined schedule, when specific conditions are met, etc.). In some embodiments, secure data commingler 206 comprises a part of a system for determining whether a tenant is identifiable based on the report data or determining a set of tenants associated with the tenant data stored on commingling storage unit 208. In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Figure 2B:
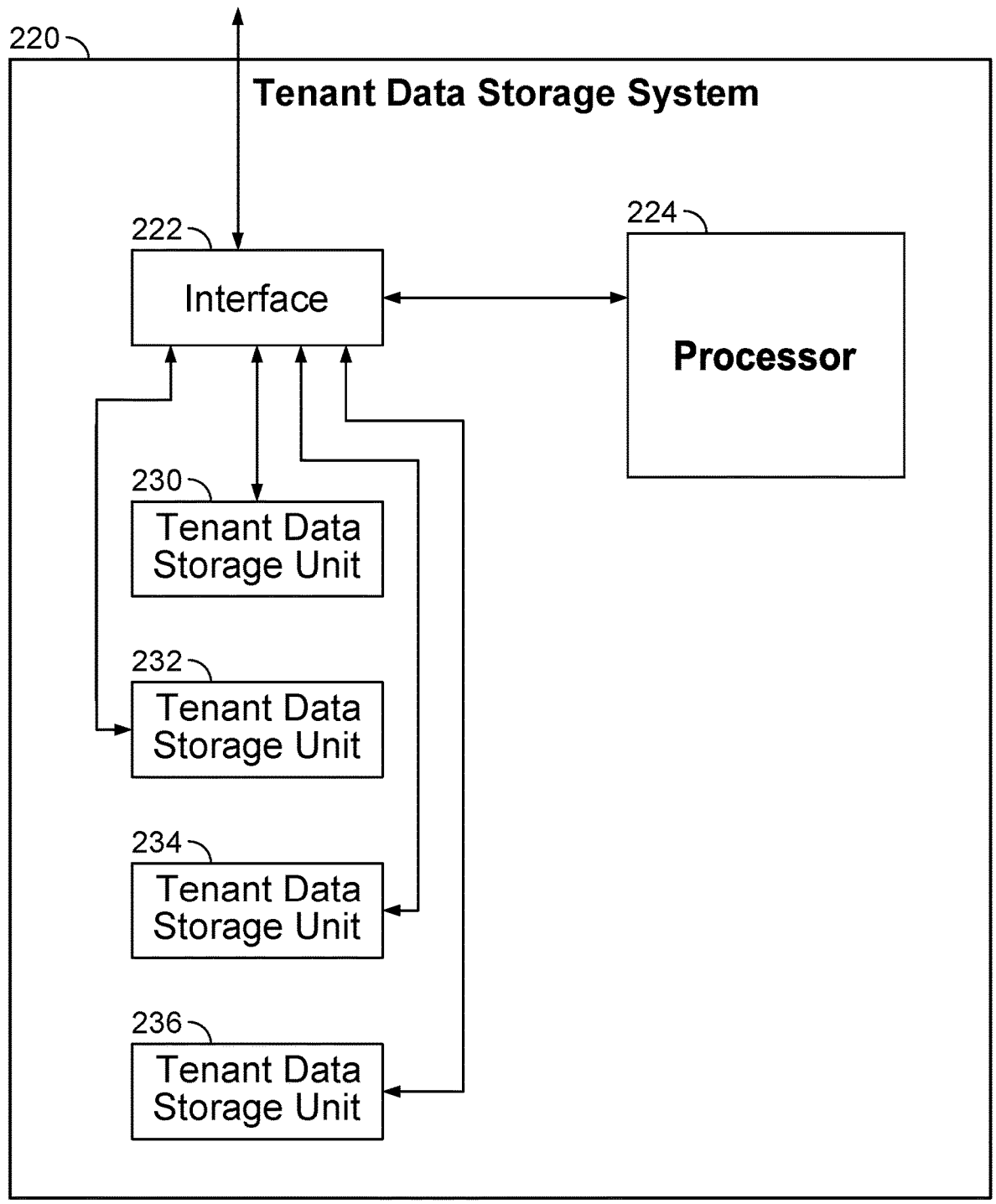
FIG. 2B is a block diagram illustrating an embodiment of a tenant data storage system.
Figure 2C:
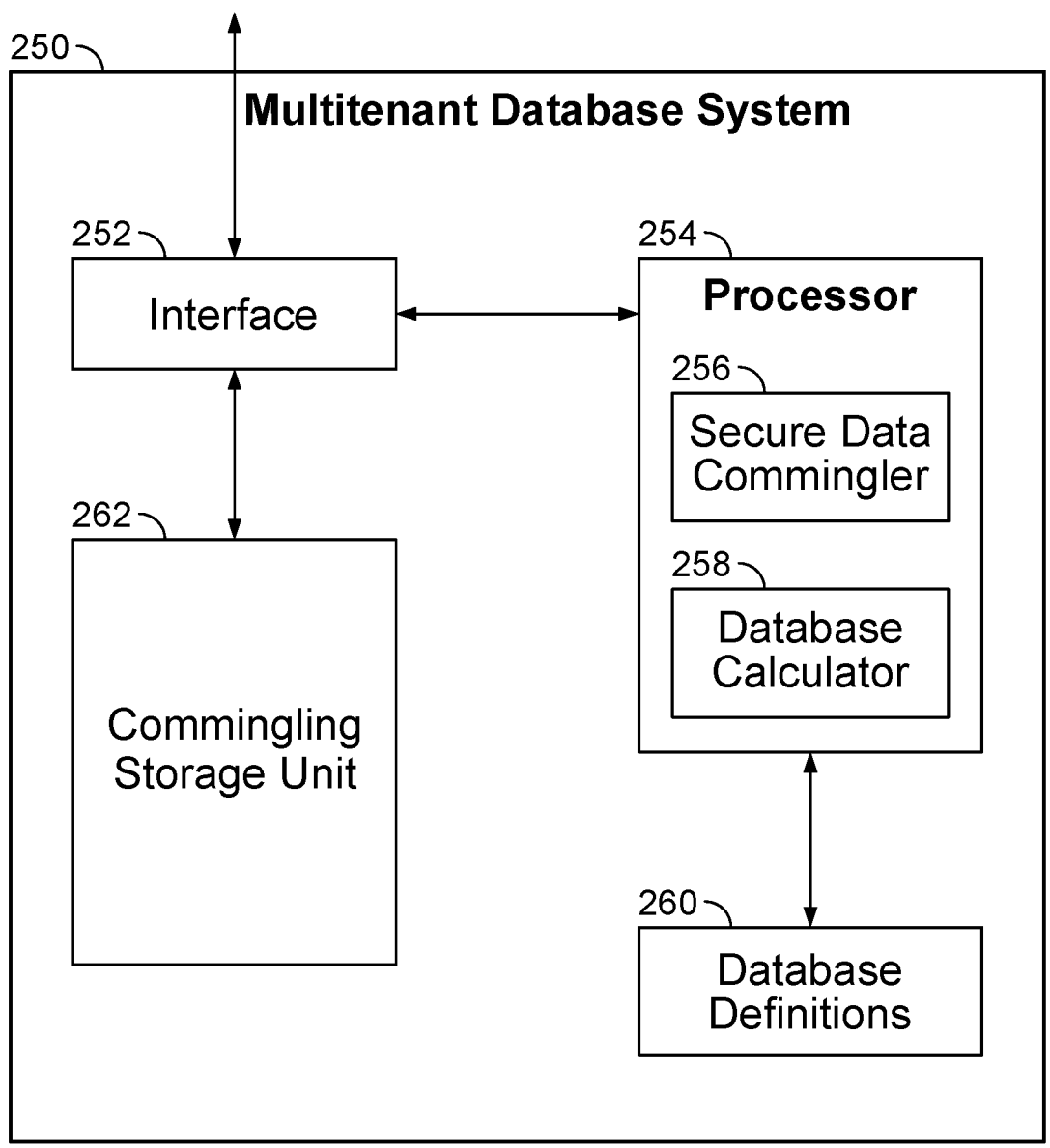
FIG. 2C is a block diagram illustrating an embodiment of a multitenant database system.
Figure 2D:
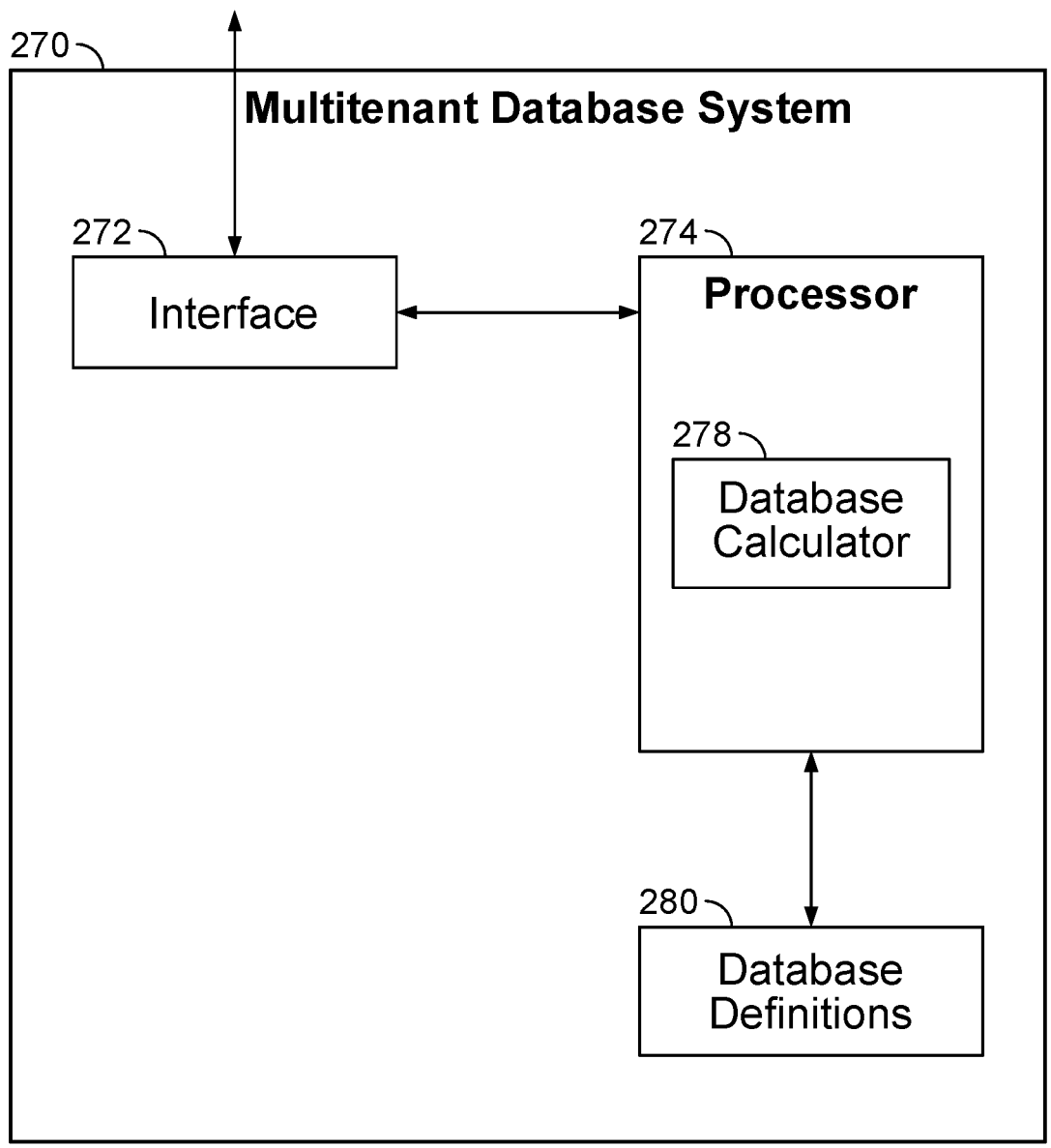
FIG. 2D is a block diagram illustrating an embodiment of a multitenant database system.

FIG. 2B is a block diagram illustrating an embodiment of a tenant data storage system. In some embodiments, tenant data storage system 220 comprises tenant data storage system 104 of FIG. 1. In the example shown, tenant data storage system 220 is used to store different tenants' data in separate storage areas in tenant data storage unit 230, tenant data storage unit 232, tenant data storage unit 234, and tenant data storage unit 236. Each tenant has associated with it a separate storage area—for example, each tenant data storage unit could be entirely associated with a different single tenant. The plurality of tenant data storage units serves to store data associated with different tenants. Tenant data storage system 220 comprises any appropriate number of tenant data storage units. Tenant data storage system 220 additionally is able to transfer tenant stored data to a commingling storage unit (not shown in FIG. 2B) for commingling a portion of tenant data. Tenant data storage system 220 comprises processor 224 and interface 222. Interface 222 comprises an interface for receiving requests to provide or store tenant data (e.g., to and from tenant data storage unit 230, from tenant data storage unit 232, from tenant data storage unit 234, or from tenant data storage unit 236) and for providing and receiving tenant data to be commingled in a commingling storage unit. Secure data commingler of another system determines one or more instances of sensitive data included in the tenant data and indicates to prevent the one or more instances of sensitive data included in the tenant data from being transferred from a tenant data storage unit to commingling storage unit. Processor 224 indicates to interface 222 to transfer tenant data to be stored in a commingling storage unit without transferring the one or more instances of sensitive data. Interface 222 additionally comprises an interface for receiving an indication to transfer data to commingling storage unit, receiving an indication of a new tenant, etc.

In various embodiments, tenant data is transferred upon request (e.g., a tenant request, an administrator request, etc.) or tenant data is transferred automatically (e.g., according to a predetermined schedule, when specific conditions are met, etc.). In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

FIG. 2C is a block diagram illustrating an embodiment of a multitenant database system. In some embodiments, multitenant database system 250 is used to implement multitenant database system 106 of FIG. 1 with tenant data storage system of FIG. 2B. In the example shown, a multitenant database system 250 receives a request, via interface 252, from a user for a service that uses multitenanted data. Database calculator 258 of processor 254 using database definitions 260 determines a report using data stored in a commingling storage unit (e.g., commingling storage unit 262) and provides the report to the user. The data in commingling storage unit 262 is acquired using secure data commingler 256 from a number of tenant data storage units. A tenant can opt into sharing data for use by a service (e.g., a benchmarking service) and the data is transferred to a commingling storage unit (e.g., commingling storage unit 262). The data is transferred in some cases automatically when the data is updated so that the data stored in the commingling storage unit is always up to date. The data is also inspected using a processor associated with the transfer of data (e.g., a processor of tenant data storage system) to determine whether there are any instances of sensitive data that should not be part of the data stored in the commingling storage unit.

FIG. 2D is a block diagram illustrating an embodiment of a multitenant database system. In some embodiments, multitenant database system 270 is used to implement multitenant database system 106 of FIG. 1 with tenant data storage system of FIG. 2A. In the example shown, a multitenant database system 270 receives a request, via interface 272, from a user for a service that uses multitenanted data. Database calculator 278 of processor 274 using database definitions 280 determines a report using data stored in a commingling storage unit and provides the report to the user. The data in commingling storage unit is acquired using a secure data commingler from a number of tenant data storage units. A tenant can opt into sharing data for use by a service (e.g., a benchmarking service) and the data is transferred to a commingling storage unit. The data is transferred in some cases automatically when the data is updated so that the data stored in the commingling storage unit is always up to date. The data is also inspected using a processor associated with the transfer of data (e.g., a processor of tenant data storage system) to determine whether there are any instances of sensitive data that should not be part of the data stored in the commingling storage unit.

In some embodiments, commingling storage unit and the secure data commingler is split between two systems and in that case multitenant database system 250 of FIG. 2C can be used in conjunction with tenant data storage system of FIG. 2A. In some cases, the two commingling storage units are each operated by the associated collocated secure data commingler. Data for a report is separately retrieved from each commingling storage unit.

FIG. 3 is a diagram illustrating an embodiment of tenant data. In some embodiments, tenant data 300 comprises tenant data stored on a tenant data storage unit (e.g., a tenant data storage unit of FIG. 2A or a FIG. 2B). In the example shown, tenant data 300 comprises data describing a set of employees (e.g., including data for identification number, name, gender, title, and salary). Some of the data comprises sensitive data (e.g., personally identifiable information, sensitive personal information, information that can be used to identify an individual, name, identification number, etc.). In the event tenant data 300 is transferred from a tenant data storage unit to a commingling storage unit, sensitive data is not transferred. In some embodiments, any data other than measure data comprises sensitive data (e.g., text, character, symbol, etc. data is considered to be sensitive data and is not transferred).

Figure 4:
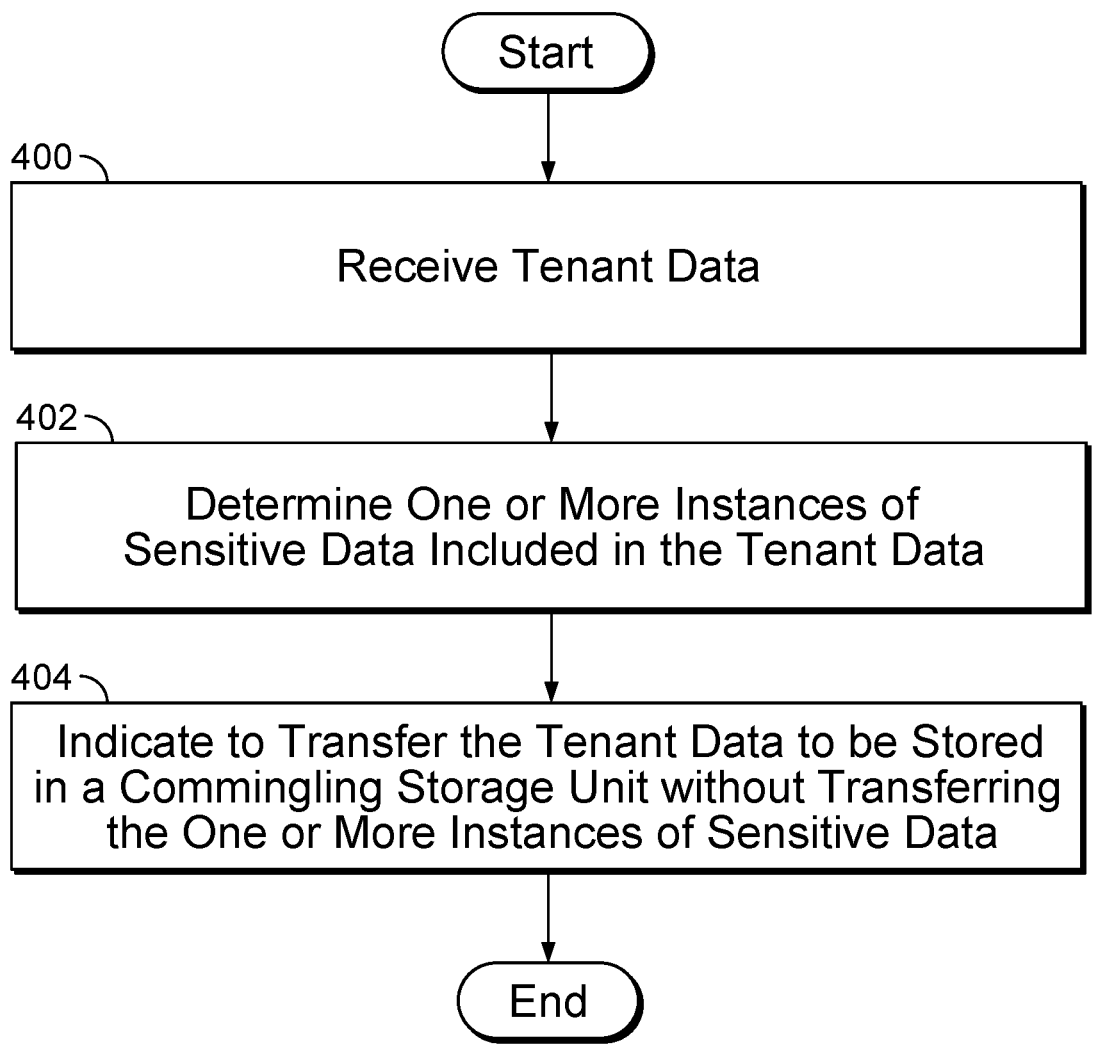
FIG. 4 is a flow diagram illustrating an embodiment of a process for secure commingling of tenant isolated data.

FIG. 4 is a flow diagram illustrating an embodiment of a process for secure commingling of tenant isolated data. In some embodiments, the process of FIG. 4 is executed by secure data commingler 206 of FIG. 2A or secure data commingler 256 of FIG. 2C. In the example shown, in 400, tenant data is received (e.g., from a tenant data storage unit). For example, tenant data is received by a system for an analytic database (e.g., a secure data commingler) from a tenant data storage system. In some embodiments, tenant data is accessed by a system for an analytic database on a tenant data storage system. In some embodiments, all tenant data is received. In some embodiments, tenant data is selected to be received according to analytics-based granularity (e.g., only data used for analytics is received). In 402, one or more instances of sensitive data included in the tenant data are determined. In 404, the process indicates to transfer the tenant data to be stored in a commingling storage unit without transferring the one or more instances of sensitive data.

Figure 5:
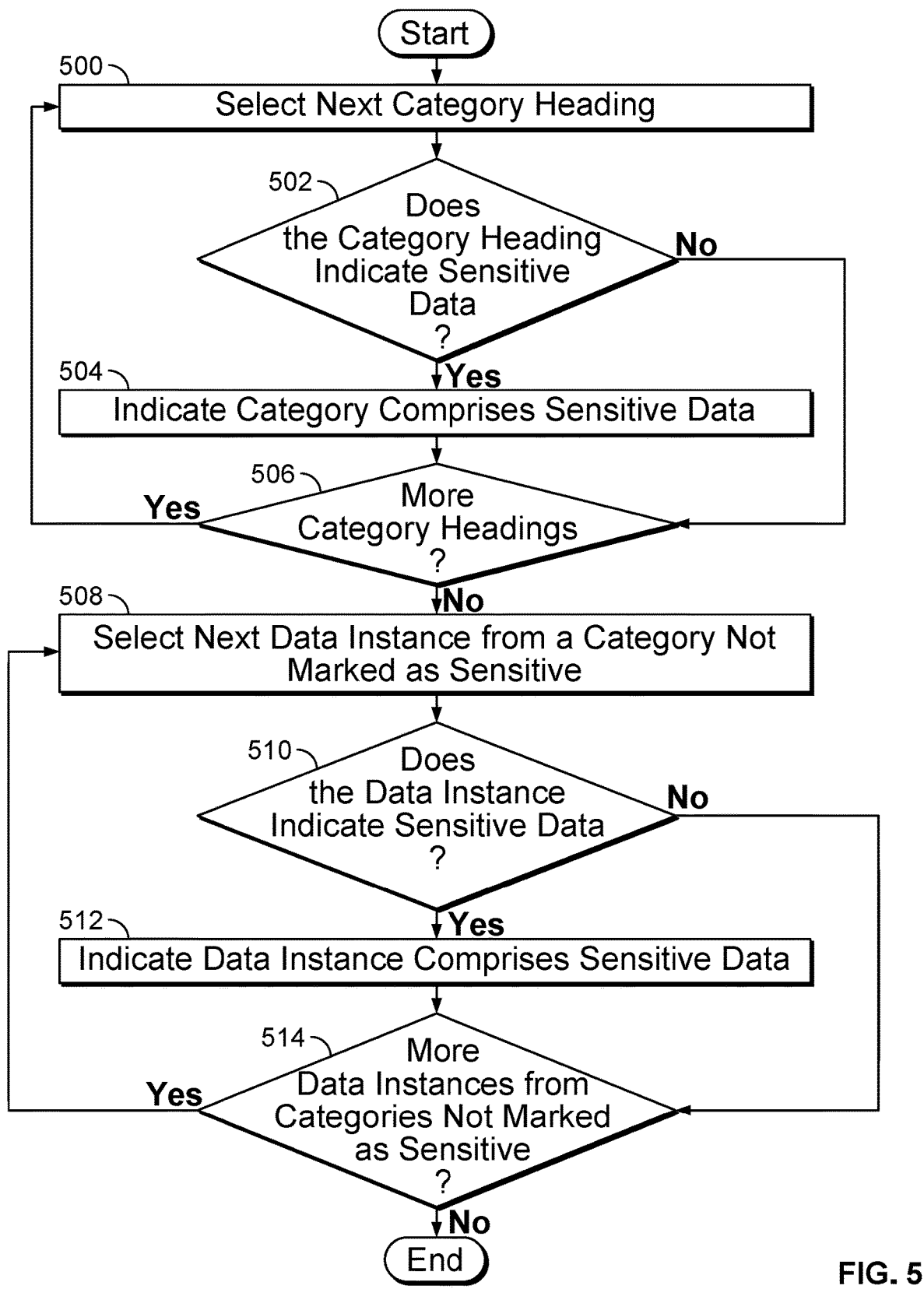
FIG. 5 is a flow diagram illustrating an embodiment of a process for determining one or more instances of sensitive data included in the tenant data.

FIG. 5 is a flow diagram illustrating an embodiment of a process for determining one or more instances of sensitive data included in the tenant data. In some embodiments, the process of FIG. 5 implements 402 of FIG. 4. In the example shown, in 500, a next category heading is selected. In some cases, the next category heading comprises the first category heading. A category heading indicates a name of a category of received tenant data. In some cases, a category heading indicates a column title (e.g., "Identification Number", "Name", "Gender", "Title", "Salary"). In 502, it is determined whether the category heading indicates sensitive data. For example, determining whether the category heading indicates sensitive data comprises determining whether the category heading indicates a sensitive data category (e.g., name, social security number, etc.). In various embodiments, determining whether the category heading indicates sensitive data comprises comparing the category heading with a set of sensitive data category heading names, comparing the category heading with a set of sensitive data category heading patterns, determining whether the category heading comprises a sensitive data indicator, or determining whether the category heading indicates sensitive data in any other appropriate way. In the event it is determined that the category heading does not indicate sensitive data, control passes to 506. In the event it is determined that the category heading indicates sensitive data, control passes to 504. In 504, it is indicated that the category comprises sensitive data. In some embodiments, indicating that the category comprises sensitive data comprises indicating that each data instance in the category comprises sensitive data. In 506, it is determined whether there are more category headings. In the event it is determined that there are more category headings, control passes to 500. In the event it is determined that there are not more category headings, control passes to 508. In 508 the next data instance from a category not marked as sensitive is selected. In some embodiments, the next data instance from a category not marked as sensitive comprises the first data instance from a category not marked as sensitive. In 510, it is determined whether the data instance indicates sensitive data. For example, determining whether the data instance indicates sensitive data comprises determining whether the data instance indicates a sensitive data category (e.g., name, social security number, etc.). In some embodiments, determining whether the data instance indicates sensitive data comprises determining whether the data instance matches a sensitive data pattern (e.g., a pattern indicating a name, a pattern indicating a social security number, etc.). In some embodiments, data of any format other than measure data is determined to indicate sensitive data. In the event it is determined that the data instance does not comprise sensitive data, control passes to 514. In the event it is determined that the data instance comprises sensitive data, control passes to 512. In 512, it is indicated that the data instance comprises sensitive data. In 514, it is determined whether there are more data instances from categories not marked as sensitive. In the event it is determined that there are more data instances from categories not marked as sensitive, control passes to 508. In the event it is determined that there are not more data instances from categories not marked as sensitive, the process ends.

Figure 6:
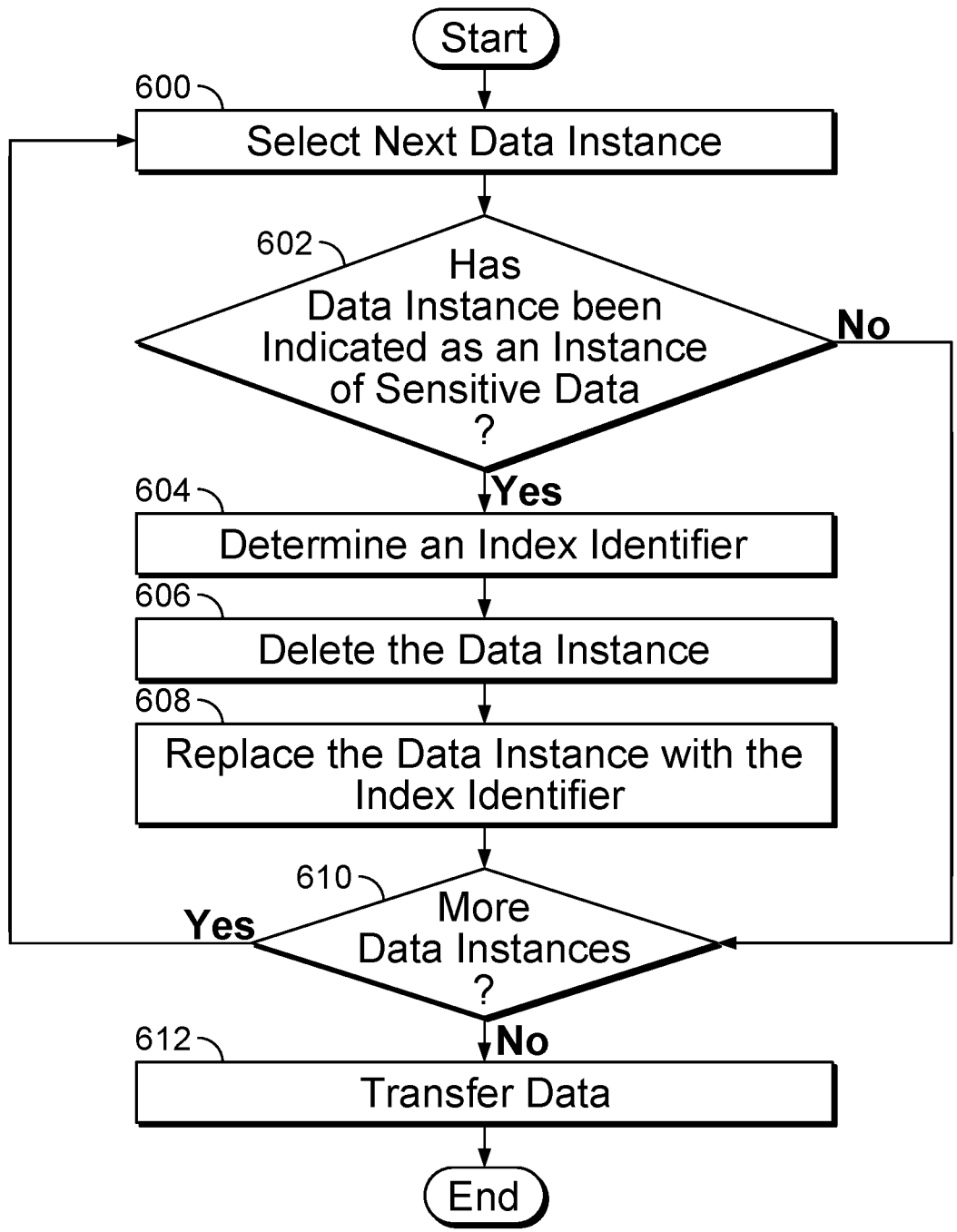
FIG. 6 is a flow diagram illustrating an embodiment of a process for transferring tenant data to be stored in a commingling storage unit without transferring one or more instances of sensitive data.

FIG. 6 is a flow diagram illustrating an embodiment of a process for transferring tenant data to be stored in a commingling storage unit without transferring one or more instances of sensitive data. In some embodiments, the process of FIG. 6 implements 404 of FIG. 4. The one or more instances of sensitive data are deleted or replaced with a marker so that the data cannot be used for identification purposes. In the example shown, in 600, a next data instance is selected (e.g., a next data instance of a set of data instances to be transferred). In some embodiments, the next data instance comprises the first data instance. In 602, it is determined whether the data instance has been indicated as an instance of sensitive data (e.g., in the process of FIG. 5). In the event the data instance has not been indicated as an instance of sensitive data, control passes to 610. In the event the data instance has been indicated as an instance of sensitive data, control passes to 604. In 604, an index identifier is determined. In various embodiments, an index identifier comprises a random number, an index identifier from a predetermined list of index identifiers, a hash of the data instance, or any other appropriate index identifier. In 606, the data instance is deleted. In 608, the data instance is replaced with the index identifier. In some embodiments, the data instance is not replaced with an index identifier (e.g., 608 is skipped). In 610, it is determined whether there are more data instances. In the event it is determined that there are more data instances, control passes to 600. In the event it is determined that there are not more data instances, control passes to 612. In 612, data is transferred (e.g., to a commingling storage unit).

Figure 7:
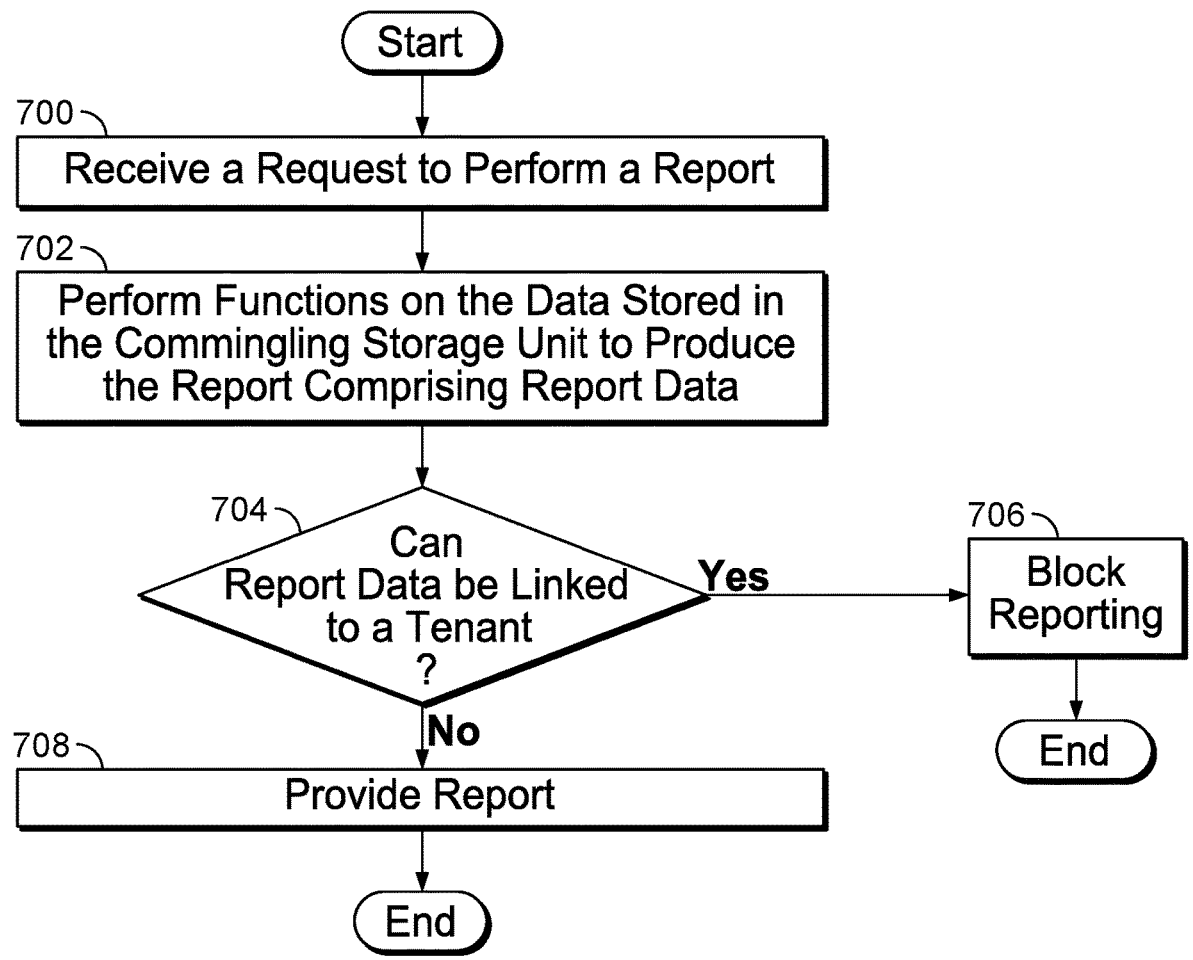
FIG. 7 is a flow diagram illustrating an embodiment of a process for reporting.

FIG. 7 is a flow diagram illustrating an embodiment of a process for reporting. In some embodiments, the process of FIG. 7 is executed by secure data commingler 206 of FIG. 2A or secure data commingler 256 of FIG. 2C. In the example shown, in 700, a request is received (e.g., from a tenant) to perform a report. For example, a request to perform a report comprises report information such as report data sources, report functions, report output parameters, etc. In 702, functions are performed on the data stored in the commingling storage unit to produce the report comprising report data. In 704, it is determined whether the report data can be linked to a tenant. In various embodiments, report data can be linked to a tenant in the event that it is identifiable as being associated with a single tenant, in the event that it is identifiable as being associated with a small number of tenants such that an inference of data can be made, in the event that it is identifiable as being associated with the report requesting tenant and a single other tenant, or report data can be linked to a tenant in any other appropriate way. For example, a processor unit (e.g., a secure data commingler) automatically determines whether report data can be linked back to a tenant or that the tenant can be inferred based on the report output. In some embodiments, the automatic determination is based on factors such as the report data source, functions and parameters associated with the determination of a benchmark analytic calculation. For example, if a user wishes to execute a report to determine the median salary of Female Software Engineers in the Bay Area working in technology companies, the processor will evaluate the report parameters and determine applicable contributed data to match the report request, then pass the results to a privacy function to determine whether enough contributors participated in the data set for an aggregation after which an individual tenant is not inferable (e.g., whether the number of contributors is greater than a threshold number of contributors). This means that the data is not able to be analyzed by the tenant requesting the report execution to determine the contributing tenants whose data is present in the data set identified by the report parameters. For another example, given prior knowledge that an outlier entity has opted in to sharing data, the system can analyze a query response or a report to determine whether, a viewer of the query response or reader of the report would be able isolate or infer data associated with the outlier entity assuming that certain knowledge is available regarding the outlier entity (e.g., it is known that 1000 small companies and a gigantic retailer are the only participants, and it is common knowledge that the gigantic retailer provides data to the system, then any 'max' value is pretty clearly going to be from the gigantic retailer, and shouldn't be returned by the system). In some cases, the multitenant database system uses its stored information regarding the outlier entity, or a stored set of publicly available set of data, to analyze the query response or report to determine whether any of the presented data represents only one entity's data or only a few entities' data such that the entity's data can be extracted or isolated. In the event it is determined that the report data can be linked to a tenant, control passes to 706. In 706, reporting is blocked, and the process ends. For example, the report is not provided. In the event it is determined in 704 that report data cannot be linked to a tenant, control passes to 708. In 708, the report is provided.

Figure 8:
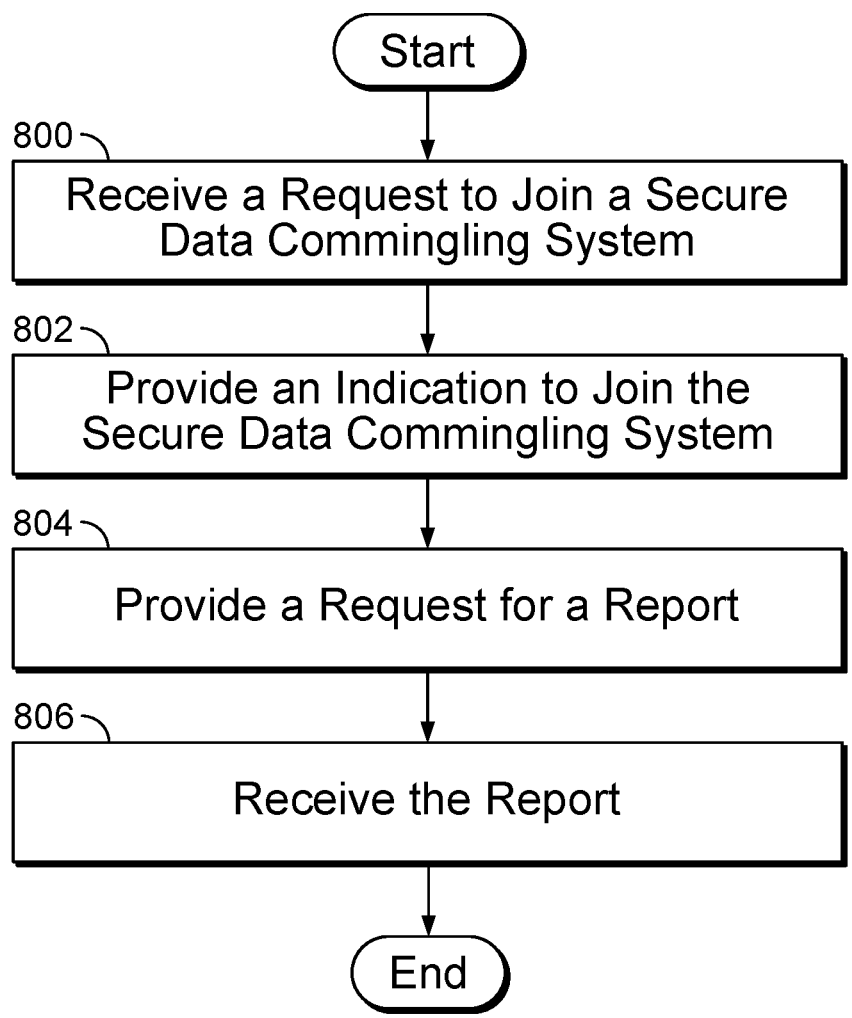
FIG. 8 is a flow diagram illustrating an embodiment of a process for interacting with a secure data commingling system.

FIG. 8 is a flow diagram illustrating an embodiment of a process for interacting with a secure data commingling system. In some embodiments, the process of FIG. 8 is executed by a tenant user using a tenant system (e.g., tenant system 108 of FIG. 1). In the example shown, in 800, a request is received to join a secure data commingling system. In 802, an indication is provided to join the secure data commingling system. In 804, a request for a report is provided. In 806, the report is received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for secure commingling of tenant isolated data, comprising:
a commingling storage unit;
an interface configured to:
receive an indication of tenant data to be commingled;
and a processor configured to:
determine one or more instances of sensitive data included in the tenant data:
indicate to transfer the tenant data to be stored in the commingling storage unit without transferring the one or more instances of sensitive data:
transferring the tenant data to the commingling storage unit;
wherein an index identifier is transferred to be stored in the commingling storage unit in place of an instance of sensitive data of the one or more instances of sensitive data, wherein the index identifier comprises a hash of the instance of sensitive data;
perform functions on the transferred tenant data stored in the commingling storage unit to produce reports comprising report data, wherein the report data comprises contributed data from one or more contributing tenants: and
block reporting of the report data in response to determining that the report data is identifiable as being linked to a contributing tenant of the one or more contributing tenants.

2. The system of claim 1, further comprising a tenant data storage unit of a plurality of tenant data storage units.

3. The system of claim 2, wherein the tenant data is received from the tenant data storage unit of the plurality of tenant data storage units.

4. The system of claim 3, wherein the tenant data is transferred automatically in the event that the tenant data on the tenant data storage unit is updated, modified, added to, and/or deleted from.

5. The system of claim 1, wherein the tenant data stored on the commingling storage unit is used for a service.

6. The system of claim 5, wherein the service comprises a benchmarking service.

7. The system of claim 1, wherein the one or more instances of sensitive data are not transferred in order that the tenant data is deidentified.

8. The system of claim 1, wherein the functions comprise operations, calculations, and/or searches.

9. The system of claim 1, wherein the report data is identifiable as being associated with a single contributing tenant.

10. The system of claim 1, wherein report data is associated with a small number of contributing tenants such that an inference about the tenant report data can be made.

11. The system of claim 1, wherein the processor is further configured to determine a set of tenants associated with the tenant data stored on the commingling storage unit.

12. The system of claim 1, wherein an instance of the one or more instances of the sensitive data comprises personally identifiable information.

13. The system of claim 1, wherein an instance of the one or more instances of the sensitive data comprises an instance of data that is not measure data.

14. The system of claim 1, wherein the tenant data is selected for transfer according to analytics-based granularity.

15. The system of claim 1, wherein the processor is further configured to determine the one or more contributing tenants.

16. A method for secure commingling of tenant isolated data, comprising:
receiving an indication of tenant data to be commingled;
determining, using a processor, one or more instances of sensitive data included in the tenant data:
indicating to transfer the tenant data to be stored in a commingling storage unit without transferring the one or more instances of sensitive data:
transferring the tenant data to the commingling storage unit;
wherein an index identifier is transferred to be stored in the commingling storage unit in place of an instance of sensitive data of the one or more instances of sensitive data, wherein the index identifier comprises a hash of the instance of sensitive data;

performing functions on the transferred tenant data stored in the commingling storage unit to produce reports comprising report data, wherein the report data comprises contributed data from one or more contributing tenants: and blocking reporting of the report data in response to determining that the report data identifiable as being linked to a contributing tenant of the one or more contributing tenants.

17. A computer program product for secure commingling of tenant isolated data, the computer program product being embodied in a non-transitory computer readable storage medium and comprising computer instructions for:

receiving an indication of tenant data to be commingled;

determining, using a processor, one or more instances of sensitive data included in the tenant data:

indicating to transfer the tenant data to be stored in a commingling storage unit without transferring the one or more instances of sensitive data:

transferring the tenant data to the commingling storage unit;

wherein an index identifier is transferred to be stored in the commingling storage unit in place of an instance of sensitive data of the one or more instances of sensitive data, wherein the index identifier comprises a hash of the instance of sensitive data;

performing functions on the transferred tenant data stored in the commingling storage unit to produce reports comprising report data, wherein the report data comprises contributed data from one or more contributing tenants: and blocking reporting of the report data in response to determining that the report data is identifiable as being linked to a contributing tenant of the one or more contributing tenants.

\* \* \* \* \*

UNITED STATES PATENT AND TRADEMARK OFFICE
CERTIFICATE OF CORRECTION

PATENT NO. : 10,579,822 B1  
APPLICATION NO. : 15/693924  
DATED : March 3, 2020  
INVENTOR(S) : Denis Gulsen, Erol Guney and Eric James Ranstrom Page 1 of 1

It is certified that error appears in the above-identified patent and that said Letters Patent is hereby corrected as shown below:

In the Claims

In Column 10, Line 40, Claim 10, before "report", delete "tenant".

Signed and Sealed this
Fifteenth Day of September, 2020

Andrei Iancu
*Director of the United States Patent and Trademark Office*